(12) United States Patent
Li et al.

(10) Patent No.: US 9,620,115 B2
(45) Date of Patent: Apr. 11, 2017

(54) CONTENT DELIVERY SYSTEM WITH BARGE-IN MECHANISM AND METHOD OF OPERATION THEREOF

(71) Applicant: Telenav, Inc., Sunnyvale, CA (US)

(72) Inventors: Weiying Li, Cupertino, CA (US); Rajeev Agarwal, Fremont, CA (US); Aliasgar Mumtaz Husain, Milpitas, CA (US); Gregory Stewart Aist, San Mateo, CA (US); Gengyan Bei, Milpitas, CA (US); Jose Sebastian, Sunnyvale, CA (US); Casey Carter, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 177 days.

(21) Appl. No.: 14/045,128

(22) Filed: Oct. 3, 2013

(65) Prior Publication Data
US 2014/0188476 A1  Jul. 3, 2014

Related U.S. Application Data

(60) Provisional application No. 61/748,746, filed on Jan. 3, 2013.

(51) Int. Cl.
| | | |
|---|---|---|
| *G10L 15/08* | (2006.01) | |
| *G10L 15/22* | (2006.01) | |
| *G10L 15/04* | (2013.01) | |
| *G10L 25/48* | (2013.01) | |
| *G10L 15/30* | (2013.01) | |

(52) U.S. Cl.
CPC ............ *G10L 15/222* (2013.01); *G10L 15/30* (2013.01); *G10L 25/48* (2013.01)

(58) Field of Classification Search
CPC ......... G10L 15/26; G10L 15/22; G10L 17/22; G10L 17/24; G10L 15/20; G10L 17/00; G10L 2015/088; G10L 2021/02082; G10L 15/222; G10L 25/48
USPC ........................ 704/4, 9, 231, 246, 251, 254
See application file for complete search history.

(56) References Cited

U.S. PATENT DOCUMENTS

| | | | |
|---|---|---|---|
| 8,279,779 B2 | 10/2012 | Singh et al. | |
| 8,949,902 B1* | 2/2015 | Fabian-Isaacs | H04N 21/439 725/40 |
| 2005/0027527 A1* | 2/2005 | Junkawitsch | G10L 15/20 704/243 |
| 2005/0288922 A1 | 12/2005 | Kooiman | |

* cited by examiner

*Primary Examiner* — Thierry L Pham
(74) *Attorney, Agent, or Firm* — IP Investment Law Group

(57) ABSTRACT

A method of operation of a content delivery system includes: receiving a command phrase based on determining an utterance type according to a travel context; determining a trigger match with a control unit based on the command phrase matching a trigger phrase; and stopping a prompt according to a prompt type based on the trigger match for controlling the prompt presented by a device.

20 Claims, 5 Drawing Sheets

CONTENT DELIVERY SYSTEM WITH BARGE-IN MECHANISM AND METHOD OF OPERATION THEREOF

CROSS-REFERENCE TO RELATED APPLICATION(S)

This application claims the benefit of U.S. Provisional Patent Application Ser. No. 61/748,746 filed Jan. 3, 2013, and the subject matter thereof is incorporated herein by reference thereto.

TECHNICAL FIELD

The present invention relates generally to a content delivery system, and more particularly to a system with barge-in mechanism.

BACKGROUND ART

Modern portable consumer and industrial electronics, especially client devices such as content delivery systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Content delivery systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a content delivery system without barge-in mechanism has become a paramount concern for the consumer. The inability decreases the benefit of using the tool.

Thus, a need still remains for a content delivery system with barge-in mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a content delivery system including: receiving a command phrase based on determining an utterance type according to a travel context; determining a trigger match with a control unit based on the command phrase matching a trigger phrase; and stopping a prompt according to a prompt type based on the trigger match for controlling the prompt presented by a device.

The present invention provides a content delivery system, including: a command module for receiving a command phrase based on determining an utterance type according to a travel context; a match module, coupled to the command module, for determining a trigger match based on the command phrase matching a trigger phrase; and an interruption module, coupled to the match module, for stopping a prompt according to a prompt type based on the trigger match for controlling the prompt presented by a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
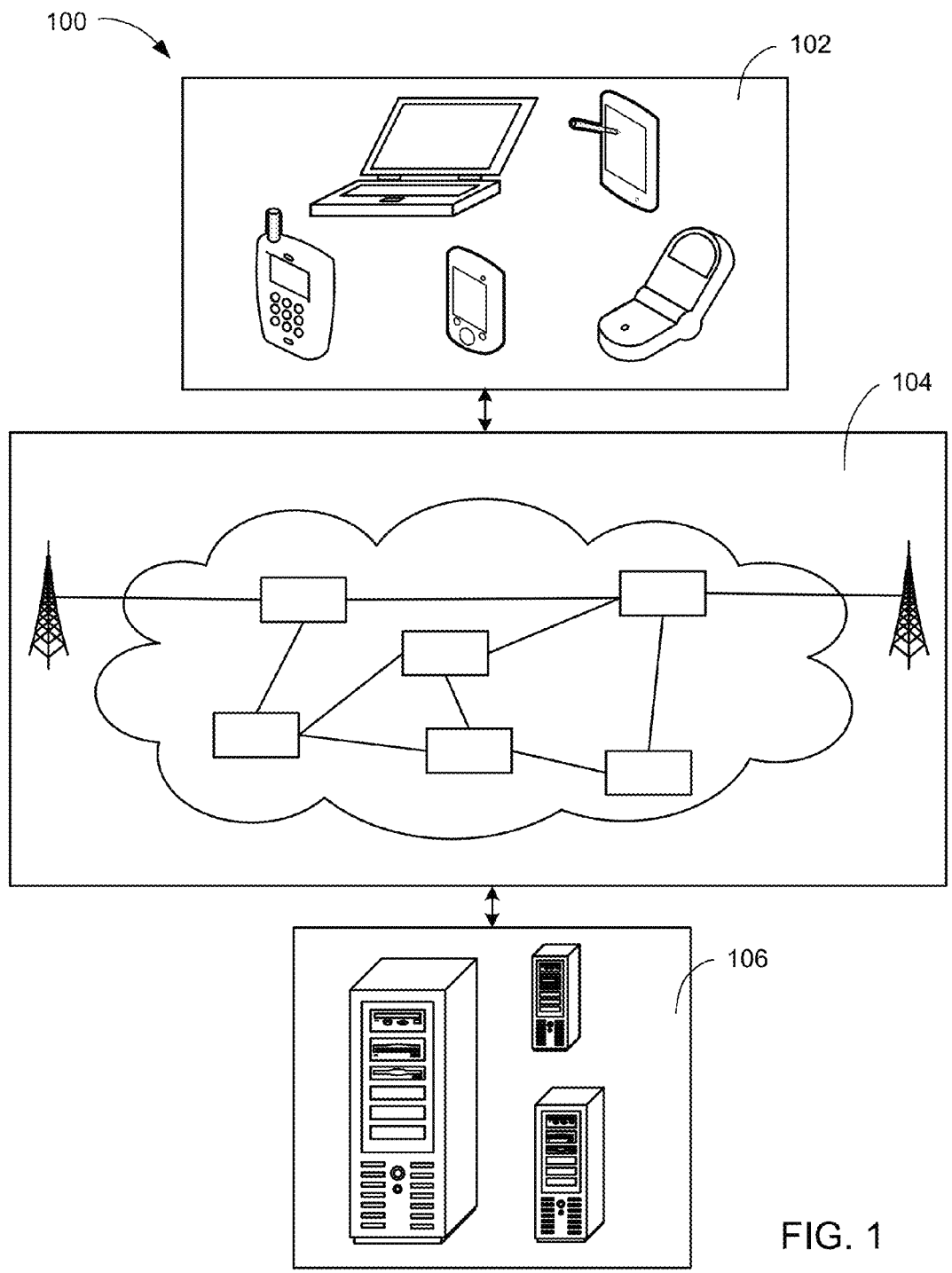
FIG. 1 is a content delivery system with barge-in mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the content delivery system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content delivery system 100 with barge-in mechanism in an embodiment of the present invention. The content delivery system 100 includes a first device 102, such as a client or a server, connected to a second device 106, such as a client or a server, with a communication path 104, such as a wireless or wired network.

For example, the first device 102 can be of any of a variety of mobile devices, such as a cellular phone, personal digital assistant, a notebook computer, automotive telematic content delivery system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the content delivery system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the content delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the content delivery system 100 is shown with the second device 106 and the first device 102 as end points of the communication path 104, although it is understood that the content delivery system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
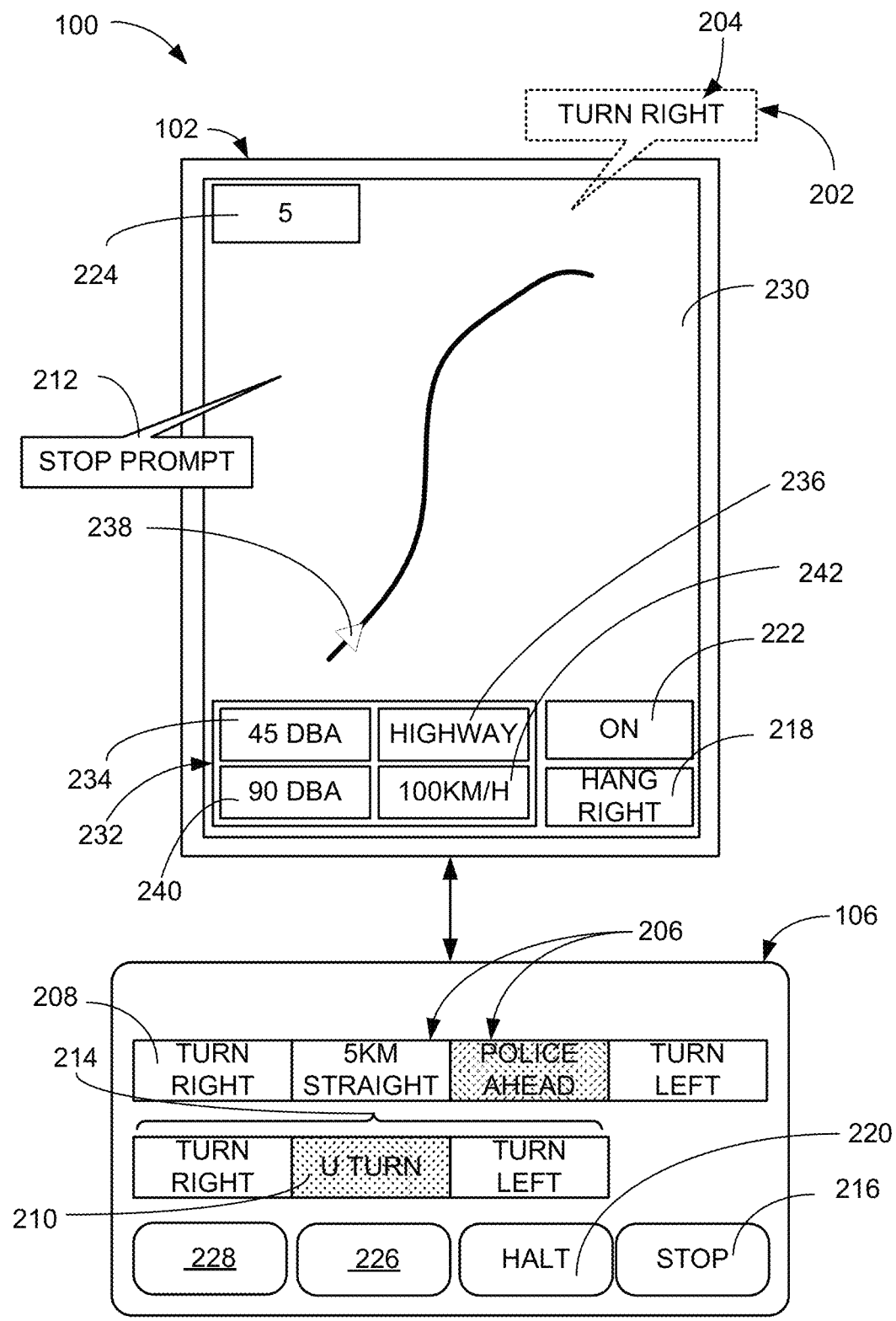
FIG. 2 is an example of a prompt presented by the first device.

Referring now to FIG. 2, therein is shown an example of a prompt 202 presented by the first device 102. For clarity and brevity, the discussion of the embodiment of the present invention will focus on the first device 102 delivering the result generated by the content delivery system 100. However, the second device 106 and the first device 102 can be discussed interchangeably.

The prompt 202 is defined as information presented by the first device 102. For example, the first device 102 can play the prompt 202 to the user to provide navigation guidance. For further example, the prompt 202 can include an audio phrase played by the first device 102 to notify the user regarding the current situation involving the operation of a vehicle. A prompt phrase 204 can represent the phrase of the prompt 202. The prompt phrase 204 can represent a single word, multiple words, an exclamatory yell, or a combination thereof.

A prompt type 206 is a categorization of the prompt 202. For example, the prompt type 206 can include an interruptible prompt 208 and an uninterruptible prompt 210. The interruptible prompt 208 is defined as the prompt 202 that can be halted by a command phrase 212. The uninterruptible prompt 210 is defined as the prompt 202 that cannot be halted by the command phrase 212. The command phrase 212 is defined as an input made to the first device 102 that stops the prompt 202. For example, the user can state the command phrase 212 to stop the interruptible prompt 208 from played by the first device 102. For another example, the user can manually enter the command phrase 212 into the first device 102 to stop the prompt 202.

A prompt pattern 214 is defined as an arrangement of the prompt type 206. For example, the prompt pattern 214 can include a combination of a plurality of the prompt type 206. More specifically, the prompt pattern 214 can include the interruptible prompt 208, the uninterruptible prompt 210, or a combination thereof. The prompt pattern 214 can also represent a plurality of the interruptible prompt 208 without the uninterruptible prompt 210. In contrast, the prompt pattern 214 can also represent a plurality of the uninterruptible prompt 210 without the interruptible prompt 208.

The content delivery system 100 can detect a trigger phrase 216 to halt the prompt 202. The trigger phrase 216 is defined as a phrase that invokes the content delivery system 100 to stop the prompt 202. For example, if the command phrase 212 stated by the user matches the trigger phrase 216, the content delivery system 100 can stop the first device 102 from continuously playing the interruptible prompt 208. The trigger phrase 216 can represent a single word, multiple words, an exclamatory yell, or a combination thereof.

A candidate phrase 218 is defined as a phrase considered by the content delivery system 100 for generating the trigger phrase 216. The candidate phrase 218 can represent a single word or multiple words. For example, the content delivery system 100 can compare the candidate phrase 218 to the prompt phrase 204 to determine whether the candidate phrase 218 can be converted as the trigger phrase 216. More specifically, the content delivery system 100 can generate the trigger phrase 216 based on the candidate phrase 218 or can be provided by the content delivery system 100 as a pre-generated trigger phrase 220. The pre-generated trigger phrase 220 can represent the trigger phrase 216 stored in the content delivery system 100 not derived from the candidate phrase 218.

A propagation switch 222 is defined as a trigger for the content delivery system 100 to propagate the stopping of the prompt 202. A barge-in level 224 is defined as the extent the content delivery system 100 can stop the prompt 202 once the trigger phrase 216 has been detected.

A confidence value 226 is defined as a score representing a degree of similarity between the candidate phrase 218 and the prompt phrase 204. For example, the confidence value 226 can range between 0 and 1 with 0 being the lowest value and 1 being the highest value. The lowest value of the confidence value 226 can represent an exact match between the candidate phrase 218 and the prompt phrase 204. In contrast, the highest value of the confidence value 226 can represent a non-match between the candidate phrase 218 and the prompt phrase 204.

A false alarm threshold 228 is defined as a requirement necessary to permit the candidate phrase 218 to be converted as the trigger phrase 216. For example, the false alarm threshold 228 can range between 0 and 1 with 0 being the lowest level and 1 being the highest level. If the lowest level represents a 0, even if the candidate phrase 218 does not match exactly with the prompt phrase 204, the content delivery system 100 can interpret the candidate phrase 218 as the trigger phrase 216. In contrast, if the highest level represents a 1, even if the candidate phrase 218 matches exactly with the prompt phrase 204, the content delivery system 100 cannot interpret the candidate phrase 218 as the trigger phrase 216.

A travel context 230 is defined as a set of facts or circumstances that surround the first device 102. For example, the travel context 230 can include an operating condition 232. The operating condition 232 can represent a noise level 234 surrounding the user of the content delivery system 100, a route type 236 traversed by the user, a geographic location 238 where the user is traveling, or a combination thereof. The operating condition 232 can also include a travel speed 242 of operating a vehicle with the content delivery system 100. A noise threshold 240 is defined as a minimum amount of the noise level 234 to be not hazardous to health. For example, the noise threshold 240 can be set based on the damaging levels of sound determined by the Occupational Safety and Health Administration (OSHA) regulations.

Figure 3:
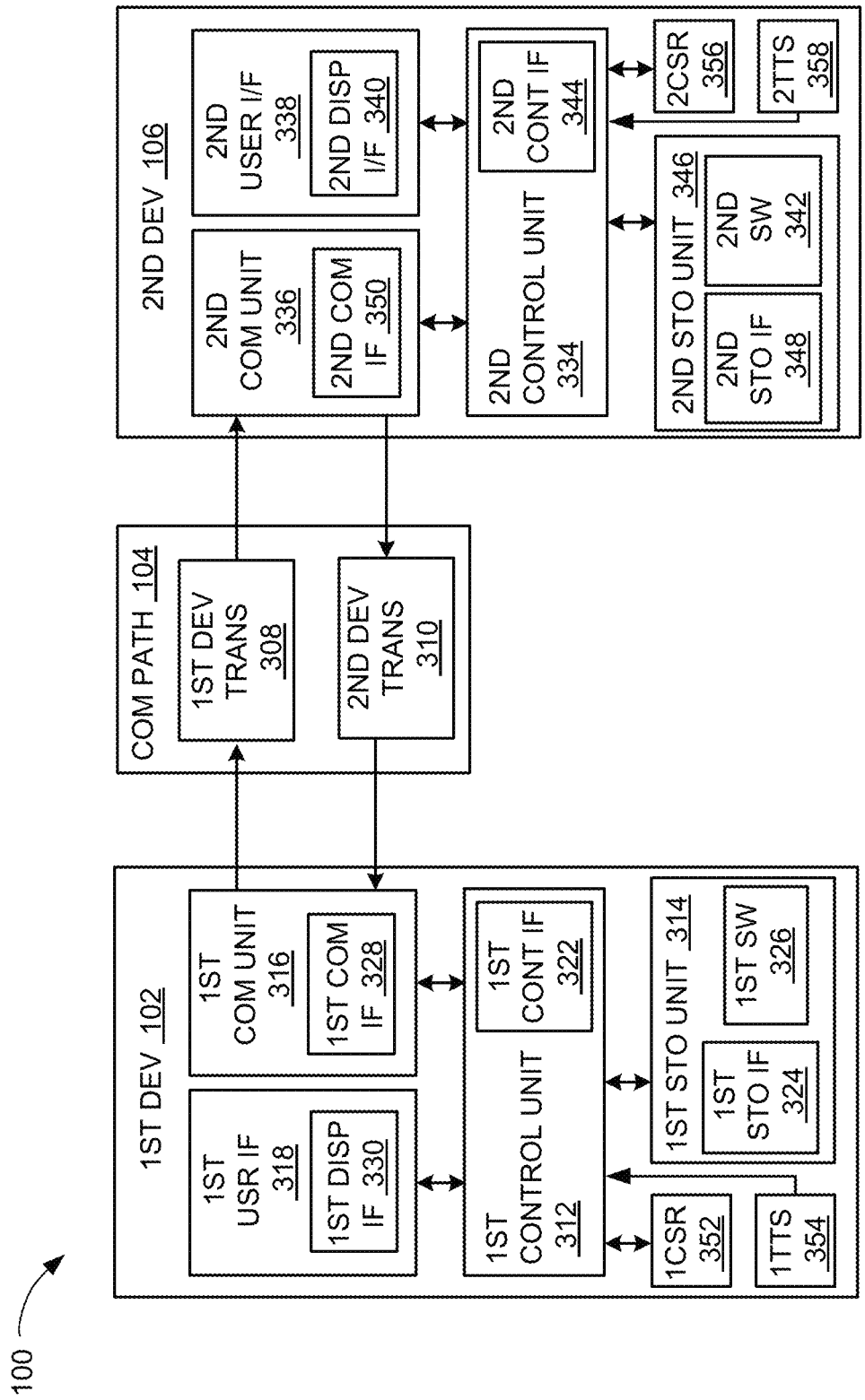
FIG. 3 is an exemplary block diagram of the content delivery system.

Referring now to FIG. 3, therein is shown an exemplary block diagram of the content delivery system 100. The content delivery system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the content delivery system 100 is shown with the first device 102 as a client device, although it is understood that the content delivery system 100 can have the first device 102 as a different type of device. For example, the first device 102 can be a server.

Also for illustrative purposes, the content delivery system 100 is shown with the second device 106 as a server, although it is understood that the content delivery system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the content delivery system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial content delivery system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the content delivery system 100. The first control unit 312 can also execute the first software 326 for the other functions of the content delivery system 100, including receiving location information from the location unit 320. The first control unit 312 can further execute the first software 326 for interaction with the communication path 104 via the first communication unit 316.

The first control unit 312 can operate a first compact speech recognizer 352. The first compact speech recognizer 352 can detect the trigger phrase 216. The first control unit 312 can operate a first text-to-speech engine 354. The first text-to-speech engine 354 can generate the audio data for the prompt 202 to be played by first device 102.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the content delivery system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the content delivery system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the content delivery system 100 is shown with the second storage unit 346 as a single hierarchy storage system, although it is understood that the content delivery system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The content delivery system 100 can be executed by the first control unit 312, the second control unit 334, or a combination thereof.

The second control unit 334 can operate a second compact speech recognizer 356. The second compact speech recognizer 356 can detect the trigger phrase 216. The second control unit 334 can operate a second text-to-speech engine 358. The second text-to-speech engine 358 can generate the audio data for the prompt 202 to be played by first device 102. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the content delivery system 100 is described by operation of the first device 102 and the second device 106. It is understood that the first device 102 and the second device 106 can operate any of the modules and functions of the content delivery system 100. For example, the first device 102 is described to operate the location unit 320, although it is understood that the second device 106 can also operate the location unit 320.

Figure 4:
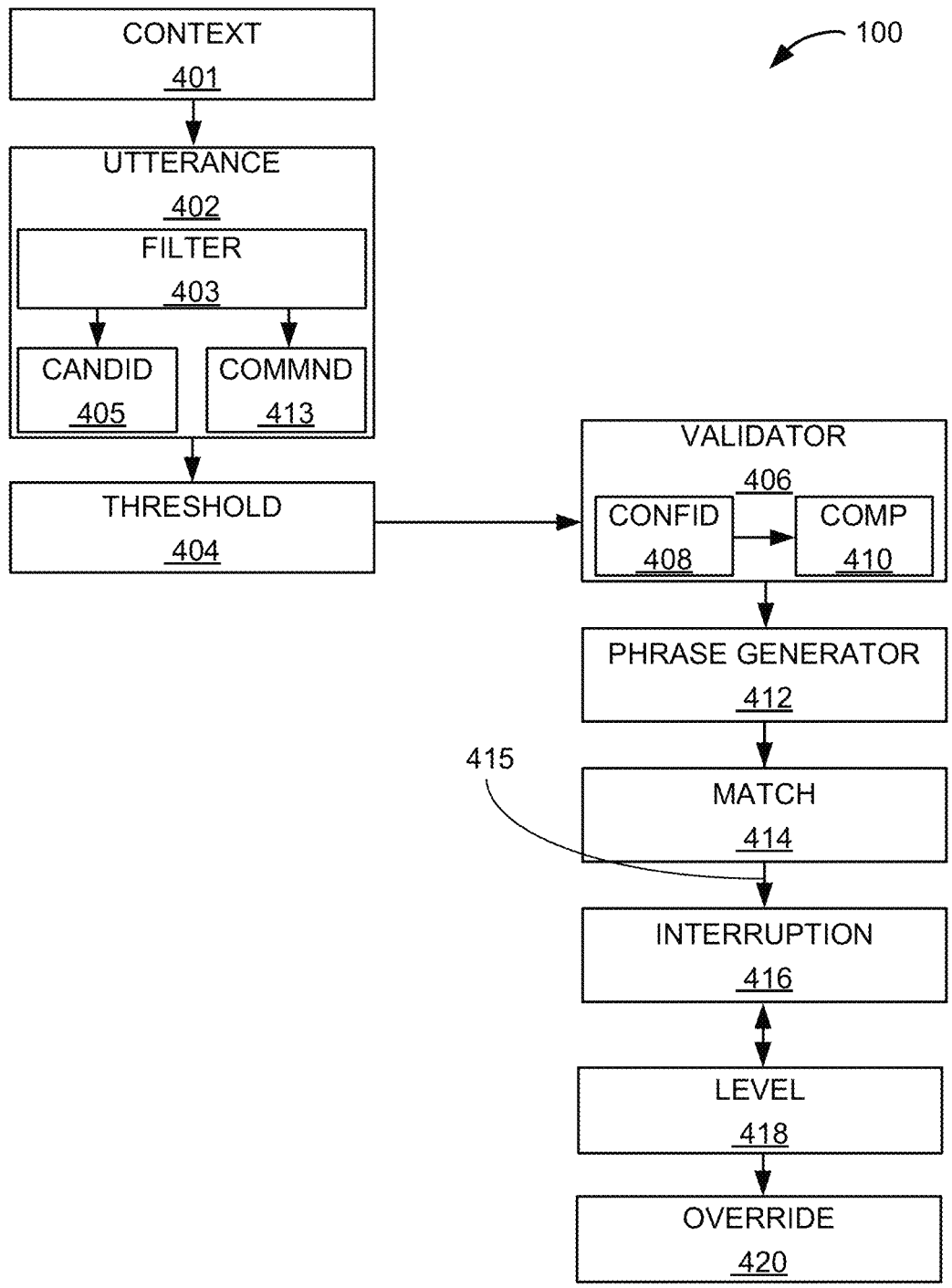
FIG. 4 is a control flow of the content delivery system.

Referring now to FIG. 4, therein is shown a control flow of the content delivery system 100. The content delivery system 100 can include a context module 401. The context module 401 determines the travel context 230 of FIG. 2. For example, the context module 401 can determine the travel context 230 based on the operating condition 232 of FIG. 2.

The context module 401 can determine the travel context 230 in a number of ways. For example, the operating condition 232 can include the noise level 234 of FIG. 2, the geographic location 238 of FIG. 2, the route type 236 of FIG. 2, or a combination thereof. The context module 401 can determine the noise level 234 to be high if the noise level 234 meets or exceeds a noise threshold 240 of FIG. 2. The geographic location 238 can represent Manhattan, N.Y. The route type 236 can represent a local street. The context module 401 can detect the noise level 234 in Manhattan to be above the noise threshold 240. As a result, the context module 401 can determine the travel context 230 of where the user of the first device 102 to be in a noisy environment.

For a different example, the context module 401 can determine the user of the content delivery system 100 is within the travel context 230 of operating the vehicle based on the travel speed 242 of FIG. 2. For example, if the travel speed 242 is 0 kilometers per hour, the context module 401 can determine the travel context 230 of the user being at a stop or not operating the vehicle. In contrast, if the travel speed 242 meets or exceeds the speed limit, the context module 401 can determine that the user is operating the vehicle. The context module 401 can send the travel context 230 to an utterance module 402.

The content delivery system 100 can include the utterance module 402, which can couple to context module 401. The utterance module 402 receives the candidate phrase 218 of FIG. 2. For example, the utterance module 402 can receive the candidate phrase 218 from the user speaking the candidate phrase 218 into the first device 102.

The utterance module 402 can include a filter module 403. The filter module 403 determines an utterance type 407, which is defined as a categorization of an audio input made to the first device 102. For example, the utterance type 407 can include the candidate phrase 218, the command phrase 212 of FIG. 2, or a combination thereof. For further example, the filter module 403 can determine whether the audio input made by the user is the candidate phrase 218 or the command phrase 212.

The filter module 403 can determine the utterance type 407 based on the travel context 230. For example, if the travel context 230 represents that the user of the content delivery system 100 is operating the vehicle, the filter module 403 can determine the utterance type 407 that the content delivery system 100 will receive or is receiving can represent the command phrase 212 to stop the prompt 202 of FIG. 2. In contrast, if the travel context 230 represents that the user is stationary, the geographic location 238 is at a start location for a travel, or a combination thereof, the filter module 403 can determine the utterance type 407 to be the candidate phrase 218 for setting up the trigger phrase 216 of FIG. 2. The filter module 403 can send the utterance type 407 to a candidate module 405 or a command module 413 based on the travel context 230. Details regarding the command module 413 are discussed below.

The utterance module 402 can include the candidate module 405, which can couple to the filter module 403. The candidate module 405 receives the candidate phrase 218. For example, the candidate module 405 can receive the candidate phrase 218 based on the utterance type 407 determined. Further, the candidate module 405 can convert the candidate phrase 218 into text format based on speech recognition algorithm for string matching purposes. The candidate module 405 can send the candidate phrase 218 to a threshold module 404.

The content delivery system 100 can include the threshold module 404, which can couple to the utterance module 402. The threshold module 404 sets the false alarm threshold 228 of FIG. 2. For example, the threshold module 404 can set the false alarm threshold 228 by categorizing the false alarm threshold 228 into multiple levels. For a specific example, the threshold module 404 can set the false alarm threshold 228 into three tiers. The threshold module 404 can set the false alarm threshold 228 as a default level, a high level, and a low level.

More specifically, the threshold module 404 can set the false alarm threshold 228 between the ranges of 0 to 1 with 0 being the lowest level and 1 being the highest level. Further, the threshold module 404 can set the default level of the false alarm threshold 228 based on the average of the highest level and the lowest level. As a result, the threshold module 404 can set the false alarm threshold 228 representing the default level to be 0.5.

For further example, the threshold module 404 can set the false alarm threshold 228 representing the default level between 0.4 and 0.6 to provide a range of values for the default level. Similarly, the threshold module 404 can set the false alarm threshold 228 for the high level between 0.8 and 1 and the low level between 0 and 0.3 to provide a range for the false alarm threshold 228. The extent of the range can based on the user setting the range, the content delivery system 100, or a combination thereof. The threshold module 404 can send the false alarm threshold 228 to a validator module 406.

The content delivery system 100 can include the validator module 406. The validator module 406 validates whether the candidate phrase 218 can be converted as the trigger phrase 216. For example, the validator module 406 can validate the candidate phrase 218 based on the confidence value 226 of FIG. 2 of the candidate phrase 218 meeting or exceeding the false alarm threshold 228.

The validator module 406 can include a confidence module 408. The confidence module 408 determines the confidence value 226. For example, the confidence module 408 can determine the confidence value 226 of the candidate phrase 218 based on the availability of the prompt phrase 204 of FIG. 2 in the prompt 202. More specifically, the confidence module 408 can determine the confidence value 226 of the candidate phrase 218 based on the string matching between the candidate phrase 218 and the prompt phrase 204. The confidence module 408 can store a plurality of the prompt phrase 204.

For a specific example, the confidence module 408 can determine the confidence value 226 between the ranges of 0 to 1 with 0 being the lowest value and 1 being the highest value. More specifically, the confidence module 408 can determine the lowest value of the confidence value 226 based on the candidate phrase 218 matching exactly with the prompt phrase 204. In contrast, the confidence module 408 can determine the highest value of the confidence value 226 based on no matching between the candidate phrase 218 and the prompt phrase 204. The confidence value 226 can range between 0 and 1 based on how similar the candidate phrase 218 is to the prompt phrase 204.

More specifically, the candidate phrase 218 and prompt phrase 204 can share a similarity based the spelling, the audio frequency, or a combination thereof between the candidate phrase 218 and the prompt phrase 204. The spoken sound can represent the audio frequency of the candidate phrase 218 spoken by the user of the first device 102. For example, the confidence module 408 can determine the confidence value 226 based on the number of rearrangement of letters required to match the spelling between the candidate phrase 218 and the prompt phrase 204. The confidence module 408 can determine the confidence value 226 based on the difference of audio frequency between the candidate phrase 218 and the prompt phrase 204. The confidence module 408 can send the confidence value 226 to a comparison module 410.

The validator module 406 can include the comparison module 410, which can couple to the confidence module 408. The comparison module 410 validates the candidate phrase 218. For example, the comparison module 410 can validate the candidate phrase 218 based on the confidence value 226 meeting or exceeding the false alarm threshold 228. The comparison module 410 can validate the candidate phrase 218 in a number of ways.

For example, if the prompt 202 includes the prompt phrase 204 that matches with the candidate phrase 218, the confidence value 226 will be 0. The comparison module 410 can determine the candidate phrase 218 as being invalid with the confidence value 226 of 0, thus, rejecting the candidate phrase 218 to be converted as the trigger phrase 216. In contrast, if the prompt 202 does not include the candidate phrase 218, the comparison module 410 can determine the candidate phrase 218 as valid to convert the candidate phrase 218 as the trigger phrase 216.

The comparison module 410 can validate the candidate phrase 218 based on the confidence value 226 meeting or exceeding the false alarm threshold 228. If the confidence value 226 meets or exceeds the false alarm threshold 228, the comparison module 410 can determine the candidate phrase 218 as unique enough to be interpreted as the trigger phrase 216. In contrast, if the confidence value 226 is below the false alarm threshold 228, the comparison module 410 can determine the candidate phrase 218 as not unique enough to be interpreted as the trigger phrase 216.

For further example, the comparison module 410 can require the confidence value 226 to be multiple times the value of the false alarm threshold 228. If the false alarm threshold 228 is set low, such as 0.2, the likelihood of the candidate phrase 218 being converted as the trigger phrase 216 is higher. If the candidate phrase 218 can easily be converted as the trigger phrase 216, more instances of the candidate phrase 218 can be determined as unique, thus, the performance of the content delivery system 100 can degrade by falsely triggering the stoppage of the prompt 202. Thus, the comparison module 410 can require the confidence value 226 to be, for example, three times the value of the false alarm threshold 228 to meet or exceed the false alarm threshold 228. The validator module 406 can send the candidate phrase 218 validated to a phrase generator module 412.

It has been discovered that the content delivery system 100 can validate the confidence value 226 based on requiring the confidence value 226 to be multiple times greater than the false alarm threshold 228 for ensuring that the trigger phrase 216 will not overlap with the prompt 202. By requiring the confidence value 226 multiple times greater than the false alarm threshold 228, the candidate phrase 218 will not be easily deemed as unique, thus, interpreted as the trigger phrase 216 even if the false alarm threshold 228 is set low. As a result, the content delivery system 100 can accurately validate the candidate phrase 218 to determine the trigger phrase 216 for efficient operation of the content delivery system 100.

The content delivery system 100 can include the phrase generator module 412, which can couple to the validator module 406. The phrase generator module 412 generates the trigger phrase 216. For example, the phrase generator module 412 can generate the trigger phrase 216 based on the candidate phrase 218 validated.

The phrase generator module 412 can generate the trigger phrase 216 in a number of ways. For example, the phrase generator module 412 can generate the trigger phrase 216 based on the pre-generated trigger phrase 220 of FIG. 2 stored in, for example, the first storage unit 314 of FIG. 3. The phrase generator module 412 can select the pre-generated trigger phrase 220 as the trigger phrase 216. For a different example, the phrase generator module 412 can generate the trigger phrase 216 based on selecting the candidate phrase 218 validated as the trigger phrase 216. The phrase generator module 412 can send the trigger phrase 216 to a match module 414.

For illustrative purposes, the content delivery system 100 is shown with the utterance module 402 receiving the candidate phrase 218, although it is understood that the utterance module 402 can be operated differently. For example, the utterance module 402 can receive the command phrase 212 based on the travel context 230.

The utterance module 402 can include the command module 413, which can couple to the filter module 403. The command module 413 receives the command phrase 218. For example, the command module 413 can receive the command phrase 212 based on the utterance type 407 determined from the user speaking the command phrase 212 into the first device 102 if the travel context 230 is determined that the user of the content delivery system 100 is operating the vehicle. The command module 413 can convert the command phrase 212 into text format based on the speech recognition algorithm for string matching purposes. The command module 413 can send the command phrase 212 to the match module 414.

The content delivery system 100 can include the match module 414, which can couple to the utterance module 402, the phrase generator module 412, or a combination thereof. The match module 414 detects the trigger phrase 216. For example, the match module 414 can determine a trigger match 415 based on the command phrase 212 matching with the trigger phrase 216 generated. The trigger match 415 is defined as an exact match between the command phrase 212 and the trigger phrase 216. Moreover, the trigger match 415 can represent that the trigger phrase 216 has been detected.

The match module 414 can determine the trigger match 415 in a number of ways. For example, the match module 414 can determine the trigger match 415 based on matching the command phrase 212 to the trigger phrase 216 utilizing the string matching algorithm similar to comparing the candidate phrase 218 to the prompt phrase 204. The similarity can be measured by the number of rearrangement of letters required to match the spelling, the sound frequency for voicing the word, or a combination thereof as discussed above.

For further example, the match module 414 can determine the trigger match 415 based on the prompt type 206 of FIG. 2 of the prompt 202 played by the content delivery system 100. If the prompt type 206 is the interruptible prompt 208 of FIG. 2, the match module 414 can compare the command phrase 212 to the trigger phrase 216 that was pre-generated, generated, or a combination thereof. If the prompt type 206 is the uninterruptible prompt 210 of FIG. 2, the match module 414 can ignore the command phrase 212, thus, the command phrase 212 will not be compared to the trigger phrase 216. For further example, if the command phrase 212 is unidentifiable after comparing to the trigger phrase 216, the command phrase 212 can be treated as the candidate phrase 218 to determine whether the command phrase 212 can be converted as the trigger phrase 216. The match module 414 can represent the first compact speech recognizer 352 of FIG. 3 or the second compact speech recognizer 356 of FIG. 3. The match module 414 can send the trigger match 415 to an interruption module 416.

It has been discovered that the content delivery system 100 can focus on detecting the trigger phrase 216 and disregarding other phrases provided in the command phrase 212 based on the prompt type 206. By focusing on the detection of the trigger phrase 216, the content delivery system 100 can reallocate the computational resource used to recognize phrases other than the trigger phrase 216. As a result, the false acceptance rate and the false rejection rate can be reduced for the safer operation of the content delivery system 100 and the vehicle.

The content delivery system 100 can include the interruption module 416, which can couple to the match module 414. The interruption module 416 stops the prompt 202. For example, the interruption module 416 can stop the interruptible prompt 208 based on the trigger match 415 of the command phrase 212 matching with the trigger phrase 216.

The interruption module 416 can stop the prompt 202 in a number of ways. For example, the interruption module 416 can stop the interruptible prompt 208 that is being played by the content delivery system 100 once the trigger phrase 216 is detected. For another example, the interruption module 416 can stop a plurality of the interruptible prompt 208 being played, scheduled to be played, or a combination thereof.

More specifically, the interruption module 416 can stop the plurality of the interruptible prompt 208 based on the propagation switch 222 of FIG. 2. If the propagation switch 222 is "on," the interruption module 416 can stop the plurality of the interruptible prompt 208 currently playing, scheduled to be played, or a combination thereof. Thus, multiple instances of the interruptible prompt 208 will not be played by the first device 102 for the user. If the propagation switch 222 is "off," the interruption module 416 can stop the interruptible prompt 208 currently playing but will not the stop the interruptible prompt 208 scheduled to be played subsequent to the interruptible prompt 208 that was stopped.

It has been discovered that the content delivery system 100 can stop the prompt 202 based on the propagation switch 222. By turning the propagation switch 222 on or off, the content delivery system 100 can control the extent to which the prompt 202 can be stopped. As a result, the content delivery system 100 can reduce the processing power and the memory allocated for the prompt 202, thus, improving the performance of the content delivery system 100 for safer operation of the vehicle.

For a different example, the interruption module 416 can stop the prompt 202 based on the prompt pattern 214 of FIG. 2 of the prompt type 206. The prompt pattern 214 can include the prompt type 206 of the interruptible prompt 208 and the uninterruptible prompt 210. As discussed above, the interruption module 416 can stop all instances of the interruptible prompt 208 once the trigger phrase 216 is detected or the trigger match 415 has been determined. In contrast, the prompt pattern 214 can include the interruptible prompt 208 and the uninterruptible prompt 210. Based on the prompt type 206, the interruption module 416 can stop the interruptible prompt 208 but will play the uninterruptible prompt 210 even if the trigger phrase 216 is detected or the trigger match 415 has been determined.

It has been discovered that the content delivery system 100 can stop the prompt 202 based on the prompt pattern 214 of the prompt type 206. By limiting the stoppage of the prompt 202 according to the prompt pattern 214, the content delivery system 100 can play the prompt 202 critical for the safety of the user. As a result, the content delivery system 100 can improve the safe operation of the content delivery system 100 and the vehicle.

The content delivery system 100 can include the level module 418, which can couple to the interruption module 416. The level module 418 generates the barge-in level 224 of FIG. 2. For example, the level module 418 can generate the barge-in level 224 based on the travel context 230 for adjusting an extent of stopping the prompt 202.

The travel context 230 can represent an emergency situation of a severe snow storm. The interruptible prompt 208 can represent live weather information related to the storm. The level module 418 can generate the barge-in level 224 by increasing or decreasing the barge-in level 224 based on the travel context 230. Continuing with the previous example, to dissuade the user from stopping the prompt 202 during the severe snow storm, the level module 418 can decrease the barge-in level 224 for the trigger phrase 216. More specifically, by decreasing the barge-in level 224 for the trigger phrase 216 from 4 to 1, the interruption module 416 can only stop one instance of the interruptible prompt 208 at a time even after detecting the trigger phrase 216 within in the travel context 230.

It has been discovered that the content delivery system 100 can adjust the barge-in level 224 based on the travel context 230. By customizing the barge-in level 224 according to the travel context 230, the content delivery system 100 can control the extent to which the prompt 202 can be stopped. By limiting the stoppage of the prompt 202 according to the travel context 230, the content delivery system 100 can play the prompt 202 critical for the safety of the user within the travel context 230. As a result, the content delivery system 100 can improve the safe operation of the content delivery system 100 and the vehicle.

For illustrative purposes, the content delivery system 100 is described with the interruption module 416 stopping the prompt 202 based on the trigger phrase 216 detected, although it is understood that the interruption module 416 can be operated differently. For example, the interruption module 416 can stop the prompt 202 based on the barge-in level 224.

Different level of the barge-in level 224 can be assigned to the trigger phrase 216. Based on the barge-in level 224, the extent or the number of the instances of the interruptible prompt 208 stopped can differ. For example, one instance of the trigger phrase 216 can include the barge-in level 224 of 1. The interruption module 416 can stop one instance of the interruptible prompt 208 with the trigger phrase 216 with the barge-in level 224 of 1. The interruption module 416 can stop five instances of the interruptible prompt 208 with the trigger phrase 216 with the barge-in level 224 of 4.

It has been discovered that the content delivery system 100 can stop the prompt 202 based on the barge-in level 224. By customizing the barge-in level 224, the content delivery system 100 can control the extent to which the prompt 202 can be stopped. As a result, the content delivery system 100 can reduce the processing power and the memory allocated for the prompt 202, thus, improving the performance of the content delivery system 100 for safer operation of the vehicle.

The content delivery system 100 can include the override module 420, which can couple to the level module 418. The override module 420 overrides the prompt 202. For example, the override module 420 can override the uninterruptible prompt 210 based on the travel context 230.

As discussed above, even if the trigger phrase is detected, the uninterruptible prompt 210 will not be stopped. However, the uninterruptible prompt 210 can be stopped based on the travel context 230. More specifically, the travel context 230 can represent an emergency situation, such as rushing to a hospital. The travel context 230 of the emergency situation can be determined based on the destination the user is heading and the speed that the vehicle is moving. Based on the travel context 230, the override module 420 can stop the uninterruptible prompt 210 to minimize the prompt 202 played by the first device 102.

It has been discovered that the content delivery system 100 can override the uninterruptible prompt 210 based on the travel context 230. By overriding the uninterruptible prompt 210 according to the travel context 230, the content delivery system 100 can control the prompt type 206 that can be stopped. By limiting the stoppage of the prompt 202 according to the travel context 230, the content delivery system 100 can play the prompt 202 critical for the safety of the user within the travel context 230. As a result, the content delivery system 100 can improve the safe operation of the content delivery system 100 and the vehicle.

The physical transformation from traveling from one instance of the travel context 230 to another instance of the travel context 230 results in the movement in the physical world, such as people using the first device 102, the vehicle, or a combination thereof, based on the operation of the content delivery system 100. As the movement in the physical world occurs, the movement itself creates additional information that is converted back into the changes in the barge-in level 224 for changing the extent of stopping the prompt 202 for the continued operation of the content delivery system 100 and to continue the movement in the physical world.

The first software 326 of FIG. 3 of the first device 102 of FIG. 3 can include the modules for the content delivery system 100. For example, the first software 326 can include the utterance module 402, the threshold module 404, the validator module 406, the phrase generator module 412, the match module 414, the interruption module 416, the context module 401, the level module 418, and the override module 420.

The first control unit 312 of FIG. 3 can execute the first software 326 for the utterance module 402 to receive the candidate phrase 218, the command phrase 212, or a combination thereof. The first control unit 312 can execute the first software 326 for the threshold module 404 to set the false alarm threshold 228. The first control unit 312 can execute the first software 326 for the validator module 406 to validate the candidate phrase 218.

The first control unit 312 can execute the first software 326 for the phrase generator module 412 to generate the trigger phrase 216. The first control unit 312 can execute the first software 326 for the match module 414 to determine the trigger match 415. The first control unit 312 can execute the first software 326 for the interruption module 416 to stop the prompt 202.

The first control unit 312 can execute the first software 326 for the context module 401 to determine the travel context 230. The first control unit 312 can execute the first software 326 for the level module 418 to generate the barge-in level 224. The first control unit 312 can execute the first software 326 for the override module 420 to override the prompt 202.

The second software 342 of FIG. 3 of the second device 106 of FIG. 3 can include the modules for the content delivery system 100. For example, the second software 342 can include the utterance module 402, the threshold module 404, the validator module 406, the phrase generator module 412, the match module 414, the interruption module 416, the context module 401, the level module 418, and the override module 420.

The second control unit 334 of FIG. 3 can execute the second software 342 for the utterance module 402 to receive the candidate phrase 218, the command phrase 212, or a combination thereof. The second control unit 334 can execute the second software 342 for the threshold module 404 to set the false alarm threshold 228. The second control unit 334 can execute the second software 342 for the validator module 406 to validate the candidate phrase 218.

The second control unit 334 can execute the second software 342 for the phrase generator module 412 to generate the trigger phrase 216. The second control unit 334 can execute the second software 342 for the match module 414 to determine the trigger match 415. The second control unit 334 can execute the second software 342 for the interruption module 416 to stop the prompt 202.

The second control unit 334 can execute the second software 342 for the context module 401 to determine the travel context 230. The second control unit 334 can execute the second software 342 for the level module 418 to generate the barge-in level 224. The second control unit 334 can execute the second software 342 for the override module 420 to override the prompt 202.

The modules of the content delivery system 100 can be partitioned between the first software 326 and the second software 342. The second software 342 can include the threshold module 404, the validator module 406, the phrase generator module 412, the match module 414, the interruption module 416, the context module 401, the level module 418, and the override module 420. The second control unit 334 can execute modules partitioned on the second software 342 as previously described.

The first software 326 can include the utterance module 402. Based on the size of the first storage unit 314 of FIG.

3, the first software 326 can include additional modules of the content delivery system 100. The first control unit 312 can execute the modules partitioned on the first software 326 as previously described.

The first control unit 312 can operate the first communication unit 316 of FIG. 3 to send the candidate phrase 218, the command phrase 212, or a combination thereof to the second device 106. The first control unit 312 can operate the first software 326 to operate the location unit 320 of FIG. 3. The second communication unit 336 of FIG. 3 can send the prompt 202 to the first device 102 through the communication path 104 of FIG. 3.

The content delivery system 100 describes the module functions or order as an example. The modules can be partitioned differently. For example, the interruption module 416 and the level module 418 can be combined. Each of the modules can operate individually and independently of the other modules.

Furthermore, data generated in one module can be used by another module without being directly coupled to each other. For example, the validator module 406 can receive the candidate phrase 218 from the utterance module 402.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively.

It has been discovered that the content delivery system 100 receiving the command phrase 212 based on determining the utterance type 407 according to the travel context 230 improves safety of operating the content delivery system 100. By filtering between the command phrase 212 versus the candidate phrase 218 according to travel context 230, the content delivery system 100 can accurately determine whether the user is desiring to stop the prompt 202 or enter the candidate phrase 218. As a result, the content delivery system 100 can determine the trigger match 415 to allocate resource efficiently to improve the safer operation of the content delivery system 100, the vehicle, or a combination thereof.

Figure 5:
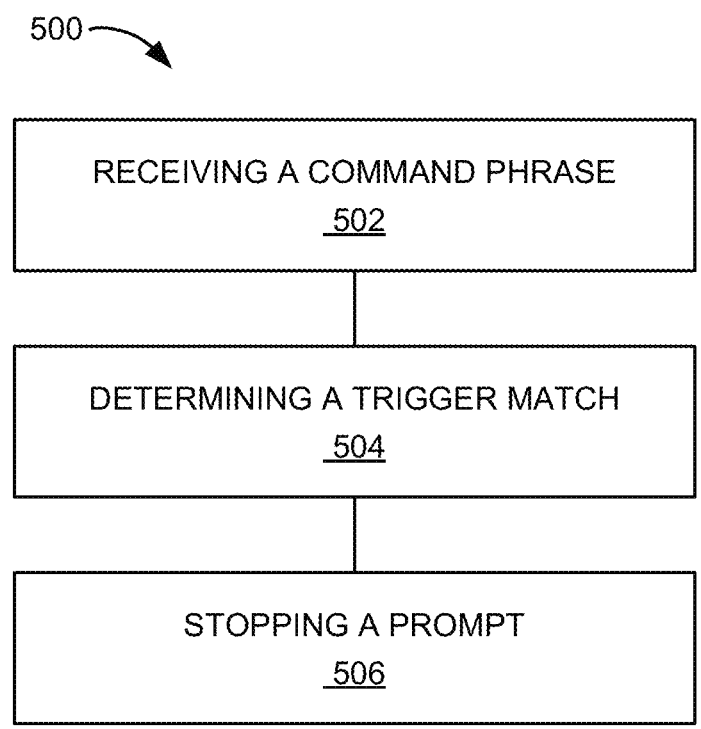
FIG. 5 is a flow chart of a method of operation of the content delivery system in a further embodiment of the present invention.

Referring now to FIG. 5, therein is shown a flow chart of a method 500 of operation of the content delivery system 100 in a further embodiment of the present invention. The method 500 includes: receiving a command phrase based on determining an utterance type according to a travel context in a block 502; determining a trigger match with a control unit based on the command phrase matching a trigger phrase in a block 504; and stopping a prompt according to a prompt type based on the trigger match for controlling the prompt presented by a device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a content delivery system comprising:
   determining an utterance type of either receiving a command phrase or setting up a trigger phrase based on a travel context;
   receiving the command phrase based on the utterance type according to the travel context;
   determining a trigger match with a control unit based on the command phrase matching the trigger phrase representing a phrase for stopping a prompt;
   stopping the prompt according to a prompt type representing an interruptible prompt based on the trigger match; and
   continue playing the prompt representing the prompt type of an uninterruptible prompt even if the trigger phase is detected for controlling the prompt presented by a device.

2. The method as claimed in claim 1 wherein stopping the prompt includes stopping the interruptible prompt based on the command phrase matching the trigger phrase.

3. The method as claimed in claim 1 wherein stopping the prompt includes stopping the prompt with a prompt pattern having a plurality of a prompt type.

4. The method as claimed in claim 1 wherein stopping the prompt includes stopping the prompt based on a barge-in level for controlling the prompt being stopped.

5. The method as claimed in claim 1 further comprising validating a candidate phrase based on a confidence value meeting or exceeding a false alarm threshold.

6. A method of operation of a content delivery system comprising:
   determining an utterance type of either receiving a command phase or setting up a trigger phase based on a travel context;
   receiving the command phrase based on the utterance type;
   determining a trigger match with a control unit based on the command phrase matching a trigger phrase representing a phrase for stopping a prompt;
   stopping the prompt according to a prompt type representing an interruptible prompt based on the trigger match; and
   continue playing the prompt representing the prompt type of an uninterruptible prompt even if the trigger phrase is detected for controlling the prompt presented by a device.

7. The method as claimed in claim 6 wherein determining the trigger match includes determining the trigger match based on the prompt type of the prompt.

8. The method as claimed in claim 6 wherein stopping the prompt includes stopping the prompt includes stopping a plurality of the interruptible prompt based on a propagation switch for controlling an extent of stopping the interruptible prompt.

9. The method as claimed in claim 6 further comprising generating a barge-in level based on the travel context for adjusting an extent of stopping the prompt.

10. The method as claimed in claim 6 further comprising overriding the uninterruptible prompt based on the travel context for stopping the uninterruptible prompt.

11. A content delivery system comprising:
a control unit for determining an utterance type of either receiving a command phrase or setting up a trigger phrase based on a travel context;
a communication interface, coupled to the control unit, for receiving the command phrase based on the utterance type according to the travel context;
wherein the control unit is for:
determining a trigger match based on the command phrase matching the trigger phrase representing a phrase for stopping a prompt,
stopping the prompt according to a prompt type representing an interruptible prompt based on the trigger match, and
continue playing the prompt representing the prompt type of an uninterruptible prompt even if the trigger phrase is detected for controlling the prompt presented by the device.

12. The system as claimed in claim 11 wherein the control unit is for stopping the interruptible prompt based on the command phrase matching the trigger phrase.

13. The system as claimed in claim 11 wherein the control unit is for stopping the prompt with a prompt pattern having a plurality of a prompt type.

14. The system as claimed in claim 11 wherein the control unit is for stopping the prompt based on a barge-in level for controlling the prompt being stopped.

15. The system as claimed in claim 11 wherein the control unit if for validating a candidate phrase based on a confidence value meeting or exceeding a false alarm threshold.

16. The system as claimed in claim 11 wherein the control unit is for:
determining the utterance type based on the travel context; and
wherein the communication interface is for receiving the command phrase based on the utterance type.

17. The system as claimed in claim 16 wherein the control unit is for determining the trigger match based on the prompt type of the prompt.

18. The system as claimed in claim 16 wherein the control unit is for stopping a plurality of an interruptible prompt based on a propagation switch for controlling an extent of stopping the interruptible prompt.

19. The system as claimed in claim 16 wherein the control unit is for generating a barge-in level based on the travel context for adjusting an extent of stopping the prompt.

20. The system as claimed in claim 16 wherein the control unit is for overriding the uninterruptible prompt based on the travel context for stopping the uninterruptible prompt.

* * * * *